(12) United States Patent
 Stevenson (10) Patent No.: US 11,052,977 B2
(45) Date of Patent: Jul. 6, 2021

(54) PIPE LAYING APPARATUS

(71) Applicant: LAYTRIX LIMITED, Darlington Durham (GB)

(72) Inventor: James Andrew Stevenson, Darlington Durham (GB)

(73) Assignee: LAYTRIX LIMITED, Darlington Durham (GB)

( * ) Notice: Subject to any disclaimer, the term of this patent is extended or adjusted under 35 U.S.C. 154(b) by 0 days.

(21) Appl. No.: 16/980,892

(22) PCT Filed: Feb. 28, 2019

(86) PCT No.: PCT/GB2019/050561
§ 371 (c)(1),
(2) Date: Sep. 15, 2020

(87) PCT Pub. No.: WO2019/186102
PCT Pub. Date: Oct. 3, 2019

(65) Prior Publication Data
US 2021/0024184 A1    Jan. 28, 2021

(30) Foreign Application Priority Data

Mar. 29, 2018 (GB) ..................... 1805198

(51) Int. Cl.
| | |
|---|---|
| *B63B 35/03* | (2006.01) |
| *B63B 27/10* | (2006.01) |
| *F16L 1/16* | (2006.01) |
| *F16L 1/20* | (2006.01) |
| *F16L 1/235* | (2006.01) |
| *E21B 19/14* | (2006.01) |

(52) U.S. Cl.
CPC .............. *B63B 35/03* (2013.01); *B63B 27/10* (2013.01); *F16L 1/161* (2013.01); *F16L 1/207* (2013.01); *F16L 1/235* (2013.01); *E21B 19/146* (2013.01)

(58) Field of Classification Search
CPC combination set(s) only.
See application file for complete search history.

(56) References Cited

U.S. PATENT DOCUMENTS

| | | | |
|---|---|---|---|
| 3,913,753 | A | 10/1975 | Swartz et al. |
| 4,286,137 | A | 8/1981 | Thome |
| 5,174,389 | A | 12/1992 | Hansen |

(Continued)

OTHER PUBLICATIONS

International Search Report for International Application No. PCT/GB2019/050561, dated May 28, 2019.

(Continued)

*Primary Examiner* — Kyle Armstrong
(74) *Attorney, Agent, or Firm* — Jason H. Vick; Sheridan Ross, PC (57) ABSTRACT

A tubular installation apparatus (1) including a lay tower (2) mounted to a support structure (4). The lay tower (2) is configured to lower a tubular section along a firing line (L) extending along the lay tower (2). A magazine (3) is removably mounted to the lay tower (2) and configured to be pre-loaded with a plurality of tubular sections. A feed mechanism (23, 25) is configured to feed one or more tubular sections from the magazine (3) to the firing line (L) of the lay tower (2) for connection to the end of a catenary.

20 Claims, 6 Drawing Sheets

(56) References Cited

U.S. PATENT DOCUMENTS

| | | | |
|---|---|---|---|
| 2003/0159854 A1* | 8/2003 | Simpson | E21B 15/003 |
| | | | 175/52 |
| 2007/0189857 A1* | 8/2007 | Vergouw | F16L 1/235 |
| | | | 405/166 |
| 2007/0209838 A1* | 9/2007 | Kraus | E21B 19/146 |
| | | | 175/52 |
| 2009/0196712 A1 | 8/2009 | Mortensen et al. | |
| 2011/0315446 A1 | 12/2011 | Salthaug | |
| 2012/0305261 A1 | 12/2012 | Roodenburg et al. | |
| 2014/0064883 A1 | 3/2014 | Sondervik | |
| 2017/0321500 A1 | 11/2017 | Roodenburg et al. | |

OTHER PUBLICATIONS

Written Opinion for International Application No. PCT/GB2019/050561, dated May 28, 2019.
International Preliminary Report on Patentability for International Application No. PCT/GB2019/050561, dated Jun. 18, 2020.
Search Report for Great Britain Serial No. 1805198.7, dated Sep. 3, 2018.

* cited by examiner

PIPE LAYING APPARATUS

CROSS-REFERENCE TO RELATED APPLICATIONS

This application is a national stage application under 35 U.S.C. 371 of PCT Application No. PCT/GB2019/050561 having an international filing date of 28 Feb. 2019, which designated the United States, which PCT application claimed the benefit of Great Britain Application No. 1805198.7, filed 29 Mar. 2018, each of which are incorporated herein by reference in their entirety.

This invention relates generally to pipe laying apparatus. More specifically, although not exclusively, this invention relates to a tubular installation apparatus for laying tubular sections in a pipelay process and a method of laying one or more tubular sections using a tubular installation apparatus.

Laying pipelines or tubulars, generally formed from tubular sections, is a common operation when constructing an offshore development, for example an oil and gas production facility. These pipelines are used to provide a means of communication with such a development, for example, to provide power, telecommunications or to deliver or receive fluids.

Traditionally, pipe laying operations are carried out by large, dedicated pipe laying vessels with permanently installed pipe laying systems, for example lay towers. These vessels are capable of laying pipelines in demanding, deep water environments where the stresses on the pipe laying equipment are large. Further, such pipe laying vessels are often deployed in locations best suited to their capabilities, for example near deep-water fields.

The conventional pipe laying process and apparatus for carrying out such a process makes the cost of development of marginal fields prohibitive. It also makes the development of fields located in shallower waters, for example parts of the North Sea, costly as generally a dedicated vessel must be hired that has capabilities far beyond what is required. The dedicated vessel may also have to travel some distance from its usual deep water location, the transit time increasing the mobilisation cost.

All offshore developments have a finite lifespan and/or may develop faults or failures that require intervention. In the case of subsea pipelines, the end of the useful life requires decommissioning of the infrastructure. This involves recovering subsea pipelines (pipe recovery) and cables from the seabed and bringing them back to shore for recycling. The decommissioning of subsea pipelines and of offshore infrastructure in general is becoming a progressively more pressing issue as existing assets age.

The current methods involved in pipeline decommissioning involve cutting a pipeline into sections and lifting each of the sections onto a specialist vessel using subsea craneage. This is a time and cost intensive process due to the requirement for specialist equipment. There is also a negative impact on the development of marginal fields in that a prospective operator or developer will foresee, and may be deterred by, the significant costs at the decommissioning stage of the project.

Furthermore, vessels for use in pipe laying or pipe recovery operations generally come equipped with dedicated on-board cranes or handling systems for lifting equipment on or off the vessel and/or to assist in carrying out the pipe laying or pipe recovery process.

Unfortunately, vessels with such dedicated craneage or handling systems cost more to operate and are less available than vessels without such equipment. However, vessels without such systems are limited in that they require dedicated quayside or dockside craneage to allow loading or unloading of the vessel. This reduces the availability of ports which may pose a problem when working in remote or less developed parts of the world. Extensive travel to allow loading or unloading of the vessel will increase the time and cost of a project.

The aforementioned problem is particularly acute in the case of a pipe laying or pipe recovery process where the supply of tubular sections must be restocked or recovered tubular sections must be offloaded on a regular basis.

It is therefore a first non-exclusive object of the invention to provide a tubular installation apparatus, a tubular recovery apparatus or a tubular handling apparatus that overcomes, or at least mitigates the drawbacks of the prior art.

Accordingly, a first aspect of the invention provides an apparatus comprising a tower, e.g. a lay tower, for lowering a tubular section along a firing line extending along the tower, a storage module mounted to the tower for receiving or configured to receive or be pre-loaded with a plurality of tubular sections and a feed mechanism for feeding tubular sections from the storage module to the firing line of the tower for connection to the end of a length of pipe, length of tubular, string, cable, umbilical or catenary.

The provision of a storage module pre-loaded with tubular sections fed automatically to the firing line enables the catenary to be extended more quickly and efficiently. The apparatus eradicates the need for a dedicated vessel crane or loading arm to lift tubular sections into the lay tower. Efficiency can be further increased by pre-loading storage modules on the deck ready for attachment to the lay tower. Such an apparatus can reduce the cost associated with pipe laying and is particularly advantageous in marginal and/or small fields.

The apparatus may be a tubular installation apparatus, e.g. for laying one or more tubular sections, for example in a pipelay process. The storage module may comprise or be a supply module.

In embodiments, the storage module is or may comprise a magazine, cartridge or cassette. The magazine, cartridge or cassette may have one or more receptacles for receiving (or distributing) tubular sections.

It will be understood that, hereinafter, any reference to magazine is also reference to cartridge or cassette unless stated otherwise.

The magazine may comprise a carousel. The magazine may be removably mounted to the tower. The magazine may comprise a one or more, e.g. a plurality of, receptacles or receiving areas (hereinafter receptacles) about its periphery, e.g. spaced or equispaced about its periphery. The magazine may be rotatably mounted to the tower and/or configured to selectively rotate, be selectively rotated, index or be indexed to one of a plurality of positons, e.g. when attached to the tower.

The magazine may be configured to selectively rotate, be selectively rotated, index or be indexed to align the or at least one or each receptacle with the firing line. The magazine may be configured to selectively rotate, be selectively rotated, index or be indexed based on or corresponding to the location of the or at least one or each receptacle.

The magazine may be substantially cylindrical or comprise a cylinder or a cylindrical or cylinder shaped body. The one or more receptacles may each comprise a radial slot. The one or more receptacles may be arranged around the circumference of the cylinder or body. The or each slot may be arranged to contain or receive one or more tubular sections.

The magazine may comprise a cuboid or substantially cuboid shaped body and the receptacles may be located on one or more or each of the sides of the cuboid or cuboid shaped body.

Two or more of the slots may be configured to contain or receive a different number of tubular sections. One or more of the slots may be configured to contain a number, e.g. a first number, of tubular sections and/or one or more of the slots may be configured to contain a different number, e.g. a second number different from the first number, of tubular sections.

The feed mechanism may be operable or configured to feed one or more tubular sections from the magazine to or toward the firing line. Additionally or alternatively, the feed mechanism may be operable or configured to feed one or more tubular sections from the firing line to or toward the magazine.

In embodiments, the or a feed mechanism may be configured to rotate, for example selectively rotate, or index the magazine, e.g. relative to the tower. The feed mechanism may comprise a drive mechanism configured to rotate or index the magazine. The feed or drive mechanism and the magazine may comprise cooperating gears, which may be configured to inter-engage so as to describe a geared drive mechanism.

The feed mechanism may comprise or be a pipe clamp. The feed mechanism or pipe clamp may comprise a pipe retrieval position, e.g. in which it is configured to extend into the storage module to retrieve a tubular section from the storage module. The feed mechanism or pipe clamp may comprise a firing line position, e.g. in which the or an axis of the feed mechanism or pipe clamp is on or collinear with the firing line and/or axis of the tower. The feed mechanism or pipe clamp may comprise a retracted position, e.g. in which the feed mechanism or pipe clamp is positioned away from the firing line and/or axis of the tower. The feed mechanism or pipe clamp may be movable between two or more of the retrieval position, firing line position and/or retracted position.

The pipe clamp may be movable along all or part of the tower, for example between a feed position, e.g. in which it is aligned with the supply module, and a hand-off position or take-up position. The pipe clamp may be movable or positionable to a lowered position, e.g. for connecting a tubular section to a catenary. The lowered position may be between the feed position and hand-off or take-up position.

The tower may comprise one or more, e.g. a pair of, mounting pins for mounting the magazine. The mounting pins may comprise a pair of spaced and/or opposed mounting pins, which may be arranged to coincide with the centreline of the magazine. The magazine may be configured to rotate or be rotated, e.g. about its centreline, when mounted to the tower.

The magazine may be releasably or removably mounted or releasably or removably attached to the tower, for example by a latch which may be a hydraulic latch. The latch may be located or installed on the tower and/or may cooperate with a keeper, strike or other feature on or of the magazine. Alternatively, the latch may be located or installed on the magazine and/or may cooperate with a keeper, strike or other feature on or of the tower. The latch may comprise the mounting pins.

The magazine may comprise a retaining means, for example a retainer, retaining or retention mechanism, for retaining or securing the one or more tubular sections in or within the magazine. The retaining means may comprise one or more retractable pins, which may be configured to extend at least partially across one or more or each of the receptacles of the magazine.

At least part of the tower may be movable, for example between a deployed or laying position (hereinafter deployed position), e.g. for laying tubular sections, and a loading position, e.g. for loading or mounting a magazine onto the tower. At least part of the tower may be pivotable, for example between the deployed position and the loading position. At least part of the tower may be movable or pivotable by an actuator, which may be hydraulic.

In the deployed position, the tower may describe, define and/or be aligned with the firing line. In the loading position, the tower may be misaligned or out of alignment with or at an angle, e.g. a non-zero or oblique or right angle, relative to the deployed position or the firing line. In the loading position, the tower may be aligned with a loading substrate, which may comprise a loading shuttle or loading trolley (hereinafter loading shuttle), e.g. for loading and/or unloading a magazine. The apparatus may comprise the loading substrate. In the loading position, at least part of the tower may be substantially horizontal and/or aligned with a magazine, which may be on or mounted to the loading substrate or shuttle.

In some embodiments, the apparatus may comprise the or a loading shuttle, which may be operable or configured to transfer or transport one or more magazines. The loading shuttle may be operable or configured to transfer or transport one or more magazines between a storage location, for example remote from the tower, and a loading location, for example proximal to the tower. When the apparatus is in the loading position and the loading shuttle is in the loading location, one or more magazines on or mounted to the loading shuttle may be positioned such that they can be mounted or loaded to the tower.

The apparatus may comprise a support structure or support to which the tower may be mounted, e.g. movably or pivotally mounted. The support structure may comprise a substrate, e.g. the loading substrate. The tower may comprise a hang-off clamp. The hang-off clamp may be mounted or connected to the support structure. The hang-off clamp may be fixed or secured relative to the support structure and/or immovable relative thereto. Alternatively, the hang-off clamp may be movably mounted to the support structure and/or pivotable relative thereto, for example to change the orientation or direction of the firing line. The direction or orientation of the firing line may be changed in order to align it with a stinger or guide.

In embodiments, the firing line of the tower may be aligned or substantially coaxial with the axis of the hang-off clamp, for example when the tower is in the deployed position. The tower and the hang-off clamp may together describe or define the or a firing line of the apparatus when so aligned or coaxial. The hang-off clamp may comprise a hydraulic clamp, for example a tubular or pipe clamp.

The support structure may comprise or be in the form of a skid or pallet, for example to which the tower may be mounted, for example movably or pivotably mounted. The support structure may comprise one or more lifting points, for example for connection to a crane or other lifting apparatus. The support structure may comprise a grillage structure. The support structure may comprise a guide, track or rail (hereinafter track) for receiving a loading shuttle.

The tower may comprise an attachment or joining means or mechanism, e.g. for attaching or joining or securing a tubular section fed into the firing line to the end of a catenary. The attachment or joining means may comprise a welding means, mechanism or apparatus, for example a welder, or a pipe-thread tightener. A catenary, for example a free end thereof, may be suspended or suspendable by the hang-off clamp.

Additionally or alternatively, the tower may comprise a cutting or separating means or mechanism, e.g. for separating or decoupling a length of tubular from a catenary.

The apparatus or tower may comprise a recovery tower or a lay tower capable of pulling, recovering and/or retrieving a tubular section, e.g. from the firing line and/or from the end of a length of pipe, length of tubular, string, cable, umbilical or catenary. The storage module may be for receiving or configured to be loaded with a plurality of recovered tubular sections and a feed mechanism for retrieving, transferring or feeding tubular sections from the firing line of the tower to the storage module.

A further aspect of the invention provides an apparatus comprising a tower, e.g. a recovery tower, for pulling, recovering and/or retrieving a tubular section from a firing line extending along the tower, a storage module mounted to the tower for receiving or configured to be loaded with a plurality of recovered tubular sections and a feed mechanism for retrieving, transferring or feeding tubular sections from the firing line of the tower to the storage module.

Having a storage module into which recovered tubular sections can be loaded without having to pull up, decouple and lay down individual tubular sections from the firing line to the deck or other area simplifies the pipe recovery process and enables a catenary to be decommissioned more quickly and efficiently. The apparatus eradicates the need for a dedicated subsea craneage to lift a catenary into the recovery tower. Efficiency can be further increased by having a plurality of empty storage modules on the deck ready for attachment to the recovery tower. Having storage modules filled with recovered tubular sections also eases the offloading of the recovered tubular sections from the vessel. Such an apparatus can reduce the cost associated with pipe decommissioning.

The apparatus may be a tubular recovery apparatus, e.g. for pulling or recovering one or more tubular sections from the end of a length of pipe, length of tubular, string, cable, umbilical or catenary (hereinafter catenary), for example in a decommissioning process.

When the tower is configured to recover or retrieve a tubular section, the aforementioned tower deployed position may comprise or function as a pulling position, e.g. for recovering tubular sections. Similarly, when the tower is configured to recover or retrieve a tubular section, the aforementioned tower loading position may comprise or function as an unloading position, e.g. for unloading a magazine from the tower. All features described above in relation to the tower and its movement between the deployed and loading positions apply to movement of the recovery tower between its deployed or pulling position and its unloading position.

When the tower is configured to recover or retrieve a tubular section, the aforementioned feed mechanism pipe retrieval position may comprise or function as a pipe loading position, e.g. in which it is configured to load a tubular section into the storage module. All features described above in relation to the feed mechanism and its movement between the pipe retrieval, firing line and retracted positions apply to movement thereof between its pipe loading, firing line and retracted positions.

The tower may comprise a hoisting means, for example a hoist or hoisting mechanism, which may be for lifting objects or operable to lift, in use, objects. The tower may be movable, for example between a first position, e.g. at which the hoisting means is on a first side of the tower, and a second position, e.g. at which the hoisting means is on a second side of the tower.

A further aspect of the invention provides an apparatus comprising a tower, e.g. a lay tower or recovery tower, and a hoisting means, e.g. a hoist or hoisting mechanism for lifting objects, wherein the tower is movable between a first position, configuration or orientation, e.g. at which the hoisting means is on a first side of the tower, and a second position, configuration or orientation, e.g. at which the hoisting means is on a second side of the tower.

The provision of a lay tower or recovery tower capable of operating as a handling apparatus eradicates the need for a dedicated vessel crane, which can reduce the cost of a pipe laying process, pipe recovery process or general vessel hire. Additionally, such an apparatus can increase the availability and flexibility of a vessel in that dedicated quayside craneage is not necessary. Therefore, smaller or more remote ports are available to a vessel the with the apparatus. As pipe laying or pipe recovery operations often take place in remote places, having such an apparatus is advantageous in that extensive travel to find a suitable port or quay may not be required, saving time and cost.

The apparatus may be a tubular handling apparatus, e.g. for moving, raising, lowering and/or handling one or more tubular sections, supply modules or objects from one location to another.

The second side may be opposed or opposite, e.g. diametrically opposed or opposite, the first side. The second side may be beside, e.g. orthogonal to, the first side. The tower may be movable, e.g. pivotable, between the first position, configuration or orientation (hereinafter position), the second position and a third position, e.g. in which the tower describes the or a firing line. The third position may be between the first and second positions. The tower may be movable, e.g. pivotable, between the first position and the second position via or through the third position.

The tower may describe an acute angle with the or a support structure, for example to which the tower is mounted, in the first position and/or may describe an obtuse angle therewith in the second position.

The tower may be mounted to the support structure by or via a linkage, for example an articulated linkage. The linkage may comprise an extendable member, for example a telescopic member. The extendable member may comprise an actuation means, such as an actuator that may be hydraulic or pneumatic, for example a hydraulic or pneumatic cylinder. The extendable member may be configured to actuate and/or move or pivot the tower, for example between the first position and second position and/or between the deployed position and the loading position. The third position may comprise or correspond to the deployed position.

The linkage may comprise a member, e.g. a first member, that may be connected between or may interconnect the extendable member and the support structure. The linkage may comprise a further member, e.g. a second member, that may be connected between, or may interconnect, the first member and the tower.

The tower may comprise or be a J-lay tower. Alternatively, the tower may be compatible with any of J-lay, S-lay, reel-lay and/or flex lay processes.

The hoist may comprise a winch. Alternatively, the hoist may comprise one or more sheaves and/or a block and tackle. The hoist may comprise a travelling pipe clamp, which may be configured to travel along the firing line. In some embodiments, the or a hoist may be arranged to suspend and lower a catenary along the firing line. Additionally or alternatively, the or a hoist may be arranged to pull or recover a tubular section along the firing line.

The tubular installation apparatus and/or tubular recovery apparatus may be configured into the tubular handling apparatus.

According to another aspect of the invention there is provided a storage module for use with an apparatus, e.g. as described above, the supply module may comprise a magazine having one or more receptacles for receiving tubular sections and/or may be mountable to a tower, e.g. a lay tower or recovery tower.

According to another aspect of the invention there is provided a vessel or barge comprising an apparatus, e.g. as described above.

According to another aspect of the invention there is provided a method of laying one or more tubular sections, the method comprising feeding a tubular section into a firing line extending along a tower, e.g. lay tower, from a storage module mounted thereto and pre-loaded with a plurality of tubular sections.

The method may comprise feeding the tubular section into the firing line for connection to the end of a length of pipe, length of tubular, string or catenary (hereinafter catenary).

The method may comprise mounting or removing a storage module. The method may comprise mounting a pre-loaded storage module and/or removing an empty, vacant or unloaded or at least partially empty, vacant or unloaded storage module.

The method may comprise positioning, configuring or moving the tower into a loading position e.g. for loading or mounting a magazine onto the tower, e.g. prior to mounting the pre-loaded magazine or at least partially vacant magazine. The method may comprise moving the tower from the loading position to a deployed position, e.g. for laying tubular sections or pulling tubular sections, with the magazine mounted.

The method may comprise attaching, connecting, joining or securing a tubular section fed into the firing line to the end of a catenary. The method may comprise connecting a tubular section by means of a mechanical connection. The method may comprise screwing a tubular section to the end of a catenary. Alternatively, the method may comprise welding a tubular section to the end of a catenary.

The method may comprise lowering the catenary with the attached tubular section and/or feeding a further tubular section from the magazine to the firing line of the tower. The method may comprise lowering the catenary using a hoist or a travelling pipe clamp.

The method may comprise hanging or suspending the catenary from a hang-off clamp, for example a hydraulic clamp. The method may comprise releasing the hang-off clamp prior to lowering the catenary and re-engaging the hang-off clamp to suspend the catenary prior to attaching a further tubular section.

In some embodiments, once the magazine is at least partially empty or at least partially vacant, the method may comprise moving the tower from the deployed, laying position to the loading position and optionally releasing or unmounting the magazine from the tower.

The method may comprise pivoting the tower, for example by operating a hydraulic actuator.

The method may comprise, when mounting and/or unmounting the magazine, operating a hydraulic latch.

In some embodiments, the method may comprise transferring a loading shuttle with a pre-loaded magazine. The method may comprise transferring the loading shuttle from a storage location, which may be remote from the tower, to a loading location, for example proximal to the tower. The method may comprise transferring the load shuttle prior to mounting the magazine to the tower.

In some embodiments, the method may comprise transferring a loading shuttle with an at least partially vacant or at least partially empty magazine between a storage location and a loading location, e.g. prior to mounting the or a further magazine to the tower and/or after unmounting the magazine from the tower.

The method may comprise transferring a loading shuttle with a magazine that is at least partially full, e.g. from the loading location after unmounting the magazine from the tower. The method may comprise positioning, configuring or moving the tower into a loading position, e.g. prior to mounting the at least partially empty or at least partially vacant magazine. The method may comprise moving the tower from the loading position to a deployed, pulling position, e.g. for recovering tubular sections, with the magazine mounted.

The method may comprise forming a tubular section by decoupling or separating a length of tubular pulled into the firing line of the tower. The method may comprise feeding the tubular section from the firing line into the magazine. The method may comprise pulling a further length of tubular into the firing line of the tower.

The method may comprise, once the magazine of recovered tubular sections is at least partially full, moving the tower from the deployed, pulling position to the loading position and/or removing or unmounting the magazine from the tower.

In some embodiments, moving the tower from the first position to the second position includes or requires moving through a third position, e.g. in which the tower describes a firing line. Moving the tower from the first position to the second position may involve or require pivoting thereof.

The method may comprise pulling, recovering and/or retrieving a tubular section from the firing line into the storage module. The tower may comprise a recovery tower.

According to a further aspect of the invention there is provided a method of recovering one or more tubular sections, the method comprising pulling, recovering and/or retrieving a tubular section from a firing line extending along a recovery tower into a storage module mounted thereto and pre-loaded with a plurality of tubular sections.

The method may comprise separating or decoupling a length of tubular from a catenary, e.g. prior to pulling, recovering and/or retrieving a tubular section from a firing line.

The method may comprise mounting or removing a storage module. The method may comprise removing a loaded or partially loaded storage module and/or mounting an empty, vacant or unloaded or at least partially empty, vacant or unloaded storage module.

The method may comprise the use of an apparatus, e.g. as described above.

According to another aspect of the invention there is provided a method of moving an object using a tower, e.g. a lay tower or recovery tower, having a hoisting means, the method comprising positioning the tower in a first position in which the hoisting means is on a first side of the tower, lifting an object located on the first side of the tower with the hoisting means such that it is suspended and moving the tower from the first position to a second position in which the hoisting means is on a second side of the tower.

In some embodiments, once the tower is in the second position, the object is lowered using the hoist. The hoist may be attached to the object or the object may be attached to the hoist via a lifting cable.

For the avoidance of doubt, any of the features described herein apply equally to any aspect of the invention.

Another aspect of the invention provides a computer program element comprising and/or describing and/or defining a three-dimensional design for use with a simulation means or a three-dimensional additive or subtractive manufacturing means or device, e.g. a three-dimensional printer or CNC machine, the three-dimensional design comprising an embodiment of the supply module described above.

A further aspect of the invention provides a computer program element comprising computer readable program code means for causing a processor to execute a procedure to implement one or more steps of the aforementioned methods. A yet further aspect of the invention provides the computer program element embodied on a computer readable medium. A yet further aspect of the invention provides a computer readable medium having a program stored thereon, where the program is arranged to make a computer execute a procedure to implement one or more steps of the aforementioned method. A yet further aspect of the invention provides a control means or control system or controller comprising the aforementioned computer program element or computer readable medium.

For purposes of this disclosure, and notwithstanding the above, it is to be understood that any controller(s), control units and/or control modules described herein may each comprise a control unit or computational device having one or more electronic processors. The controller may comprise a single control unit or electronic controller or alternatively different functions of the control of the system or apparatus may be embodied in, or hosted in, different control units or controllers or control modules. As used herein, the terms "control unit" and "controller" will be understood to include both a single control unit or controller and a plurality of control units or controllers collectively operating to provide the required control functionality. A set of instructions could be provided which, when executed, cause said controller(s) or control unit(s) or control module(s) to implement the control techniques described herein (including the method(s) described herein). The set of instructions may be embedded in one or more electronic processors, or alternatively, may be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement. In any event, the set of instructions described herein may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

Embodiments of the invention will now be described by way of example only with reference to the accompanying drawings in which.

Figure 1:
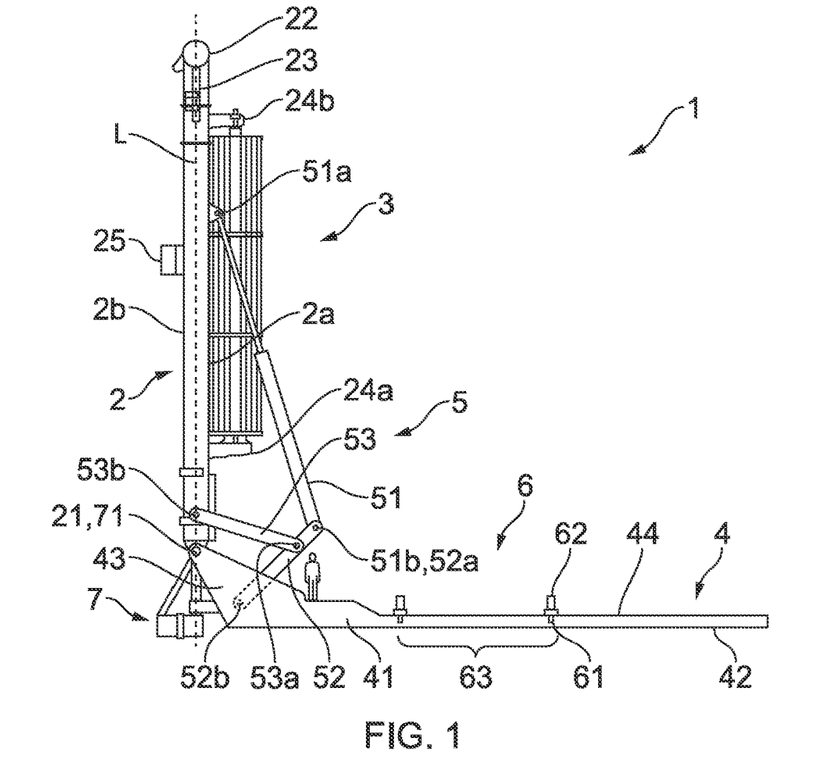
FIG. 1 is a schematic of an apparatus according to an embodiment of the invention in a deployed position.

Referring now to FIG. 1, there is shown a tubular installation apparatus 1 according to an embodiment of the invention which includes a lay tower 2 having a supply module 3 mounted thereto. The lay tower 2 is pivotally connected to a support structure 4 via linkage 5 configured to pivot the lay tower 2. A loading shuttle 6 is engaged with and configured to traverse the support structure 4. A hang-off clamp 7 is pivotally mounted to the support structure 4 in this embodiment such that the lay tower 2 and hang-off clamp 7 share a common pivot axis.

In FIG. 1, the lay tower 2 is shown in a deployed position in which it is aligned with the firing line L. The firing line L is described by the axis of the hang-off clamp 7. The firing line L describes the line along which tubular sections are laid or pulled. The lay tower 2 and firing line L are perpendicular to the support structure 4 in this configuration. The lay tower 2 is pivotally connected to the support at pivot point 21.

Extending from the second end 22 of the lay tower 2 in the direction of the pivot point 21 is an internal pipe clamp 23. The internal pipe clamp 23 has a first or top position shown in FIG. 1 and a second or lower position in which it lies proximate or adjacent the hang-off clamp 7. The internal pipe clamp 23 also has an intermediate position between the first position and the second position in which it can engage a tubular section fed into the firing line L. The internal pipe clamp 23 is movable between the first, intermediate and second positions.

Mounted to and extending from a first side 2a of the lay tower 2 are a pair of spaced, opposed mounts or mounting pins 24a, 24b. The first mounting pin, or base pin 24a is fixed relative to the lay tower 2 and the second mounting pin 24b is movable relative to the lay tower 2. The second mounting pin 24b is hydraulically actuated in this embodiment. The second mounting pin 24b is configured to pivot about the axis of the lay tower 2 in this embodiment. In some embodiments, the second mounting pin 24b is configured to move along the axis of the lay tower 2. The pair of opposed mounting pins 24a, 24b are collinear.

Mounted to and protruding from a second side 2b of the lay tower 2 is a pipe clamp 25 arranged to close around and grip the outer surface of a tubular section. The pipe clamp 25 is movable between and can take up any of three positions in the present embodiment. The first position is a firing line position in which the axis of the pipe clamp 25 is collinear with the firing line L. The second position is a pipe retrieval/loading position in which the pipe clamp 25 extends into the supply module 3 such that it can retrieve a tubular section from the supply module 3 and/or load a tubular section into the supply module 3. The third position is a retracted position in which the pipe clamp 25 is positioned away from the firing line L. The pipe clamp 25 is configured to traverse all or part of the length of the lay tower 2 in this embodiment from a feed position as shown in FIG. 1 in which it is aligned with the supply module 3 to a hand-off position or take-up position. Between the feed position and hand-off position is a lowered position which allows a tubular section to be connected to a catenary. In the lowered position a tubular section is brought into abutting relationship with the end of a catenary. In some embodiments, in the hand-off position, the pipe clamp 25 lies proximate or adjacent the hang-off clamp 7. In some embodiments, the hand-off position is the lowered position. The pipe clamp 25 is a hydraulic pipe clamp in this embodiment.

In the present embodiment, the pipe clamp 25 provides a feed mechanism arranged to feed a tubular section from the supply module 3 into the firing line L and/or feed a tubular section from the firing line L into the supply module 3. The lay tower 2 also includes a drive mechanism (not shown) which forms part of the feed mechanism in this embodiment. The drive mechanism is in the form of a geared drive mechanism arranged to rotate the supply module 3 when mounted to the lay tower 2.

The supply module 3 (as shown in more detail in FIGS. 2 to 4) is in the form of a magazine in this embodiment. The supply module 3 is rotatably mounted to the lay tower 2 between the mounting pins 24a, 24b such that the mounting pins 24a, 24b are aligned with an axis 31 of the supply module 3. The supply module 3 has an aperture 32 centred on the axis 31 and extending the length of the supply module 3. When mounted on the lay tower 2 the mounting pins 24a, 24b extend into the aperture 32 of the supply module 3.

The supply module 3 has a circular cross section and a cylinder-shaped body in this embodiment. A first end of the supply module 3 has a first securing mechanism 33a that lies substantially flush with an end of the supply module 3. A second securing mechanism 33b protrudes from the other end of the supply module 3. Each of the first and second securing mechanisms 33a, 33b are in in the form of a resiliently biased clamp for facilitating attachment to the lay tower 2.

The supply module 3 has a plurality of receptacles 34 in the form of radial slots arranged around the circumference of the supply module 3 in this embodiment. The receptacles 34 are each configured to receive one or more tubular sections.

Figure 4:
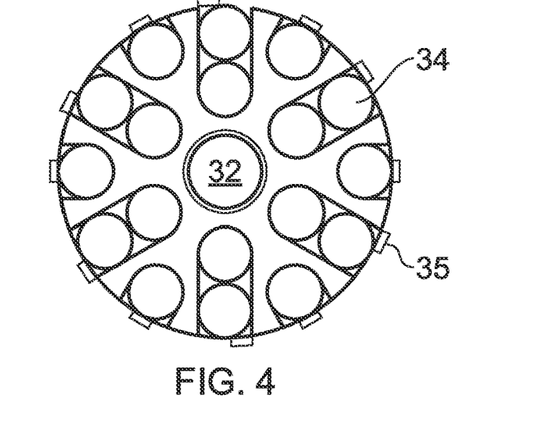
FIG. 4 is a sectional view through a supply module according to an embodiment of the invention.

The supply module 3 has a retention mechanism in the form of retractable pins 35 (FIG. 4) configured to extend partially across each of the plurality of receptacles 34. FIG. 4 shows the retractable pins 35 in a deployed condition.

The supply module 3 has a further retention mechanism in the form of retainer lips (not shown) located at either end of the supply module 3. In the case of tubular sections having end fittings or pipe joints having a greater diameter than the tubular section, the end fittings or pipe joints abut and are supported by the retainer lips.

Figure 2:
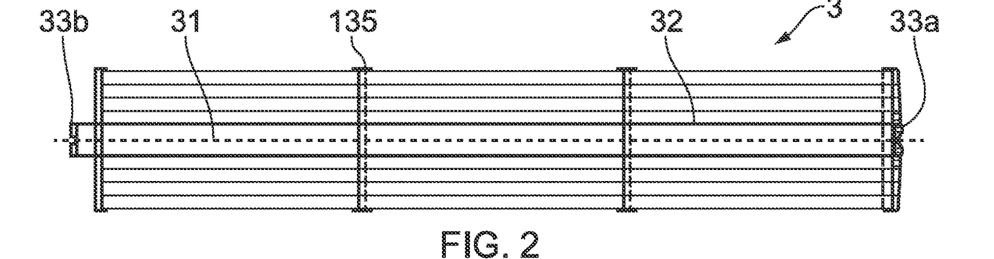
FIG. 2 is a side view of a supply module according to an embodiment of the invention.
Figure 3:
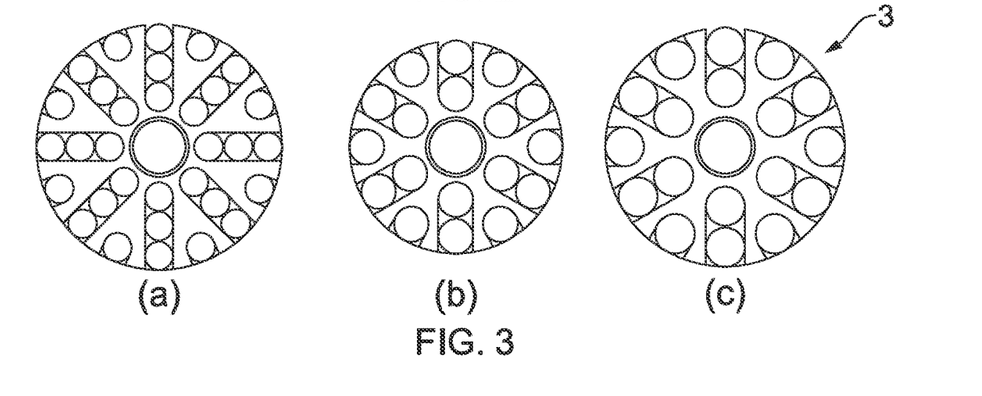
FIGS. 3a, 3b and 3c are sectional views through supply modules according to embodiments of the invention.

FIG. 2 shows an alternative retention mechanism, to that of retractable pins 35, in the form of a pair of spaced retention belts 135 arranged to circumscribe the supply module 3.

Referring back to FIG. 1, the support structure 4 is in the form of a skid in this embodiment and has a first, mounting portion 41 and a second, loading portion 42. The mounting portion 41 has a greater thickness than the loading portion 42. The mounting portion 41 and loading portion 42 are formed separately and connected together in this embodiment.

The mounting portion 41 has a web 43 extending therefrom and to which the lay tower 2 is pivotally mounted. The loading portion 42 has a track 44 described therein and configured to receive the loading shuttle 6. The support structure 4 has a grillage structure (not shown).

The support structure 4 has lifting points (not shown) in this embodiment for attachment to an external lifting apparatus.

The linkage 5 includes a telescopic member 51 pivotally connected at a first end 51a to the first side 2a of the lay tower 2 and pivotally connected at a second end 51b to the first end 52a of a first member 52. A second end 52b of the first member 52 is pivotally connected to the support structure 4. A second member 53 is pivotally connected at a first end 53a to the first member 52 intermediate of its ends 52a, 52b and pivotally connected at a second end 53b to the first side 2a of the lay tower 2. The telescopic member 51 is hydraulically actuated in this embodiment.

The loading shuttle 6 engages the track 44 of the support structure 4. The loading shuttle 6 has wheels 61 in this embodiment to allow for movement of the shuttle 6 along the track 44. The loading shuttle 6 also has a pair of spaced load supports 62. The loading shuttle 6 is shown in a loading location 63.

The hang-off clamp 7 is pivotally mounted to the web 43 of the support structure 4 at pivot point 71. The firing line L extends along the axis of the lay tower 2 and along the axis of the hang-off clamp 7. The axis of the pipe clamp 25 when in the firing line position, the axis of the lay tower 2 and the axis of the hang-off clamp 7 are coaxial when the apparatus 1 is in the deployed condition. The hang-off clamp 7 is in the form of a hydraulic pipe clamp similar to pipe clamp 25 and arranged to close around and grip the outer surface of a tubular section.

Figure 5:
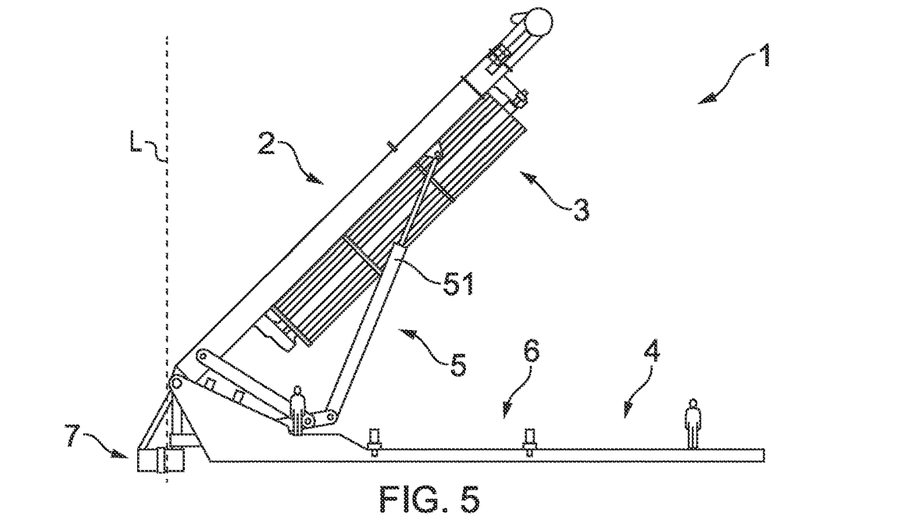
FIG. 5 is a schematic of the apparatus of FIG. 1 between a deployed position and a loading position.
Figure 7:
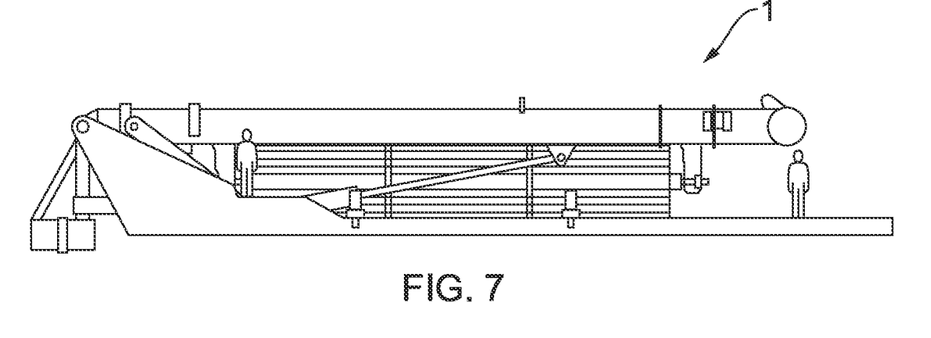
FIG. 7 is a schematic of the apparatus of FIG. 1 in a loading position.

Referring now to FIG. 5, there is shown the apparatus 1 with the lay tower 2 in an intermediate position between the deployed position of FIG. 1 and a loading position as shown in FIG. 7. The lay tower 2 forms an acute angle with the support structure 4 in this position. The axis of the lay tower 2 is not aligned with the firing line L as described by the axis of the hang-off clamp 7.

With the lay tower 2 in this position, the telescopic member 51 is in a greater state of retraction relative to the telescopic member 51 of FIG. 1.

Figure 6:
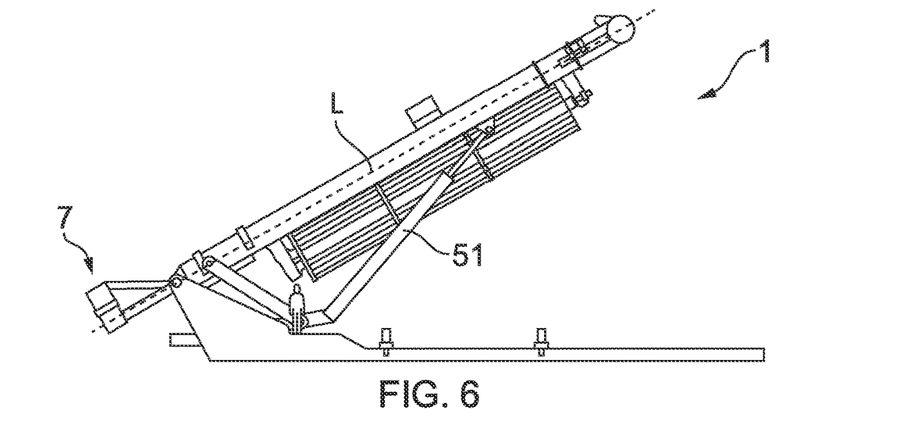
FIG. 6 is a schematic of the apparatus of FIG. 1 in an alternative deployed position.

Referring now to FIG. 6, there is shown the lay tower 2 in an alternative deployed position to that of FIG. 1. As in FIG. 5, the lay tower 2 forms an acute angle with the support structure 4 when in this position. Further, the telescopic member 51 is in a greater state of retraction relative to the telescopic member 51 in both FIGS. 1 and 5.

In the configuration of FIG. 6, the hang-off clamp 7 has been rotated about pivot point 71 such that the axis of the lay tower 2 is coaxial with the axis of the pipe clamp 25 when in the firing line position and the axis of the hang-off clamp 7. In this configuration, the firing line L forms an acute angle with the support structure 4.

Referring now to FIG. 7, there is shown the lay tower 2 in the loading position. In this position, the lay tower 2 has been rotated about pivot point 21 with the support structure 4 such that it lies parallel to the support structure 4. In this configuration, the axis of the lay tower 2 lies perpendicular to the firing line L as described by the axis of the hang-off clamp 7.

In this configuration, the loading shuttle 6 is in the loading location 63 such that when the lay tower 2 is in the loading position, the pair of load supports 62 are positioned to support the supply module 3 if dismounted from the lay tower 2.

Figure 8:
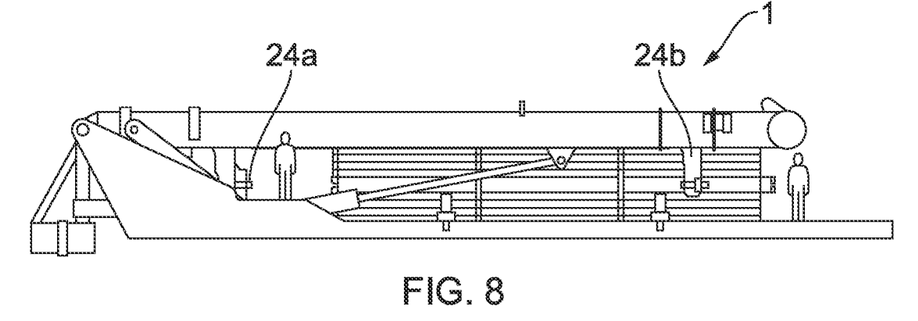
FIG. 8 is a schematic of the apparatus of FIG. 1 with a supply module unmounted.

Referring now to FIG. 8, there is shown the lay tower 2 in the loading position as per FIG. 7 with the supply module 3 dismounted and supported by the loading shuttle 6. In this case, the second mounting pin 24b has been rotated about the axis of the lay tower 2 such that it does not obstruct movement of the loading shuttle 6 along the track 44 when the supply module 3 is mounted thereto.

Figure 9:
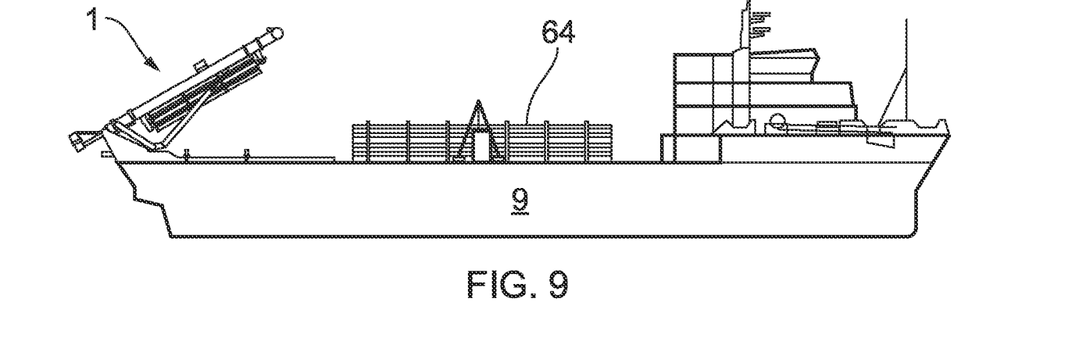
FIG. 9 is a schematic of the apparatus of FIG. 1 installed on a vessel.

In this configuration, the loading shuttle 6 has been moved along the track 44 away from the mounting portion 41 and such that the first mounting pin 24a no longer engages the aperture 32 of the supply module 3. Referring now to FIG. 9 there is shown the apparatus 1 in the configuration of FIG. 6 mounted on a vessel 9. The storage location 64 is shown where supply modules 3 are stored prior to being transported to the loading location 63.

In use, when laying one or more tubular sections, a supply module 3 having a plurality of tubular sections stored therein is transferred from the storage location 64 to the loading location 63 along the track 44 of the support structure 4 using the loading shuttle 6. During this transfer the retractable pins 35 of the retention mechanism are deployed such that inadvertent falling of tubular sections from the supply module 3 is prevented. Alternatively, any other suitable retention mechanism may be deployed.

With the lay tower 2 in the loading position, the loading shuttle 6 is moved along the track 44 until the first mounting pin 24a engages the aperture 32 of the supply module 3 via the first securing mechanism 33a. Once the first mounting pin 24a is engaged, the second mounting pin 24b is rotated about the axis of the lay tower 2 so as to engage the aperture 32 of the supply module 3 via the second securing mechanism 33b such that the supply module 3 is rotatably mounted between the mounting pins 24a, 24b.

The lay tower 2 is then pivoted relative to the support structure 4 by extending the telescopic member 51 via hydraulic actuation.

The lay tower 2 is pivoted about pivot point 21 from the loading position to a deployed position in which the lay tower 2 axis is collinear with the firing line L described by the hang-off clamp 7.

Once in the deployed position, the supply module 3 is selectively rotated or indexed using the drive mechanism to align one of the receptacles 34 such that a tubular section can be fed from the receptacle 34 to the firing line L. Once in the deployed position, the retractable pins 35 are retracted such that tubular sections can be fed from the supply module 3.

Once a receptacle 34 is aligned, the pipe clamp 25 in the feed position aligned with the supply module 3, is configured into the pipe retrieve/load position such that it can feed a tubular section from the receptacle 34.

In embodiments, the retractable pins 35 associated with a given receptacle 34 are only retracted when said receptacle 34 is aligned, all other retractable pins 35 remaining in a deployed position until their respective receptacle 34 is aligned.

Once the tubular section is gripped by the pipe clamp 25 in the pipe retrieve/load position, the pipe clamp 25 is configured into the firing line position such that the tubular section lies along the firing line L.

The pipe clamp 25 is then moved along the firing line L to a lowered position so as to lower the tubular section until an end of the tubular section contacts or abuts the end of a catenary suspended by the hang-off clamp 7. The tubular section is attached to the end of the catenary by mechanical connection in the present embodiment.

The internal pipe clamp 23 is then lowered from its first position to its intermediate position so as to engage an interior of the tubular section attached to the end of the catenary.

Once the tubular section is attached and the internal pipe clamp 23 engaged, the pipe clamp 25 and the hang-off clamp 7 are disengaged. The internal pipe clamp 23 is configured to take up the weight of the catenary and lower the catenary along the firing line L to the second position of the internal pipe clamp 23. Prior or during lowering of the catenary, the pipe clamp 25 is configured into the retracted position and returned to the feed position.

The hang-off clamp 7 is then re-engaged so as to grip the catenary with the new tubular section attached. The internal pipe clamp 23 is then returned to its first position.

If a given tubular section is the first to be laid, the hang-off clamp 7 is in a disengaged condition and the internal pipe clamp 23 lowers the tubular section through the hang-off clamp 7. Once the internal pipe clamp 23 reaches its second position, the hang-off clamp 7 grips the tubular section and the internal pipe clamp 23 disengages and is returned to its first position.

Another tubular section is fed from the same receptacle 34 as the previous one and the process is repeated. Alternatively, if a given receptacle 34 is exhausted of tubular sections, the supply module 3 is selectively rotated or indexed to align another receptacle 34 such that a further tubular section can be fed into the firing line L and the process is repeated.

Once the supply module 3 is exhausted or at least partially exhausted, the lay tower 2 is pivoted about pivot point 21 relative to the support structure 4 into the loading position via hydraulic actuation of the extendable member 51. The supply module 3 is supported by an empty loading shuttle 6 in the loading location 63.

The second mounting pin 24b is rotated relative to the supply module 3 such that it lies out of the path of the supply module 3 on the loading shuttle 6 when moved along the track 44.

The empty or partially empty supply module 3 is transferred along the track 44 to the storage location 64.

The same or another loading shuttle 6 with a supply module 3 having a plurality of tubular sections is transferred from the storage location 64 to the loading location 63 where it can be attached to the lay tower 2 and the process above is repeated.

Although the apparatus 1 is described as being a tubular installation apparatus 1 for laying one or more tubulars above, this need not be the case. The apparatus 1 may be a tubular recovery apparatus used to pull or recover one or more tubulars, in which case the lay tower 2 becomes a recovery tower 2.

In use, when pulling or recovering one or more tubular sections, an at least part empty or part vacant supply module 3 is transferred from the storage location 64 to the loading location 63 along the track 44 of the support structure 4 using the loading shuttle 6. During this transfer the retractable pins 35 of the retention mechanism are deployed if the supply module is part empty such that inadvertent falling of tubular sections from the supply module 3 is prevented.

With the recovery tower 2 in the loading position, the loading shuttle 6 is moved along the track 44 until the first mounting pin 24a engages the aperture 32 of the supply module 3. Once the first mounting pin 24a is engaged, the second mounting pin 24b is rotated about the axis of the recovery tower 2 so as to engage the aperture 32 of the supply module 3 such that the supply module 3 is rotatably mounted between the mounting pins 24a, 24b.

The recovery tower 2 is then pivoted relative to the support structure 4 about pivot point 21 by extending the telescopic member 51 via hydraulic actuation.

The recovery tower 2 is pivoted from the loading position to a deployed position in which the recovery tower 2 axis is collinear with the firing line L described by the axis of the hang-off clamp 7.

Once in the deployed position, the supply module 3 is selectively rotated or indexed using the drive mechanism to align one of the vacant or partially vacant receptacles 34 such that a tubular section can be fed from the firing line L to the receptacle 34. Once in the deployed position, if the supply module is only partially vacant, the retractable pins 35 are retracted such that tubular sections can be fed to the supply module 3.

With the end of a catenary suspended by the hang-off clamp 7, the internal pipe clamp 23 is moved along the firing line L from its first position to its second position. When in the second position, the internal pipe clamp 23 engages an end of the catenary. With the internal pipe clamp 23 engaged, the pipe clamp 25 and the hang-off clamp 7 are disengaged. The internal pipe clamp 23 takes the weight of the catenary and is moved along the firing line L toward the first position, pulling the catenary along the firing line.

Once at or near the first position, the hang-off clamp 7 is re-engaged so as to grip the catenary. A tubular section is decoupled from the catenary by cutting the length of catenary located between the internal pipe clamp 23 and hang-off clamp 7.

With a receptacle 34 aligned and a tubular section decoupled, the pipe clamp 25 is configured into the pipe retrieval/load position so as to feed the decoupled tubular section from the firing line L into the receptacle 34.

Once a tubular section is fed into the receptacle, the pipe clamp 25 is configured into the retracted position and the process is repeated. If a given receptacle 34 is full, the supply module 3 is selectively rotated or indexed to align another receptacle 34 such that a further tubular section can be fed from the firing line L and the process is repeated.

Once the supply module 3 is full or at least partially full, the recovery tower 2 is pivoted relative to the support structure 4 into the loading position. The supply module 3 is supported by an empty loading shuttle 6 in the loading location 63.

The second mounting pin 24b is rotated relative to the supply module 3 such that it lies out of the path of the supply module 3 on the loading shuttle 6 when moved along the track 44.

The full or partially full supply module 3 is transferred along the track 44 to the storage location 64.

The same or another loading shuttle 6 with a vacant or partially vacant supply module 3 is transferred from the storage location 64 to the loading location 63 where it can be attached to the recovery tower 2 and the process above is repeated.

It will be appreciated by those skilled in the art that several variations to the aforementioned embodiments are envisaged without departing from the scope of the invention. For example, although it is described that the pipe clamp 25 and hang-off clamp 7 are arranged to close around and grip the outer surface of a tubular section, this need not be the case. Instead, either or both pipe clamp 25 and hang-off clamp 7 may be arranged to close around the outer surface of a tubular section such that an end fitting of a tubular section is supported by the pipe clamp, i.e. the end fitting of the tubular section has a greater diameter than that described by the closed pipe clamp.

Additionally, although the feed mechanism is described as being the pipe clamp 25, this need not be the case. Instead, the feed mechanism may be a separate feed mechanism, for example, pair of spaced counter-rotating rollers. Alternatively, the feed mechanism may be in the form of a mechanical arm in the lay tower or recovery tower 2 or a spring-loaded mechanism located within the supply module 3. Additionally, the pipe clamp 25 may receive a tubular section from the separate feed mechanism and be configured to traverse the lay tower or recovery tower 2.

The internal pipe clamp 23 may be an external pipe clamp configured to at least partially extend over an end of a tubular section.

In embodiments, the pipe clamp 25 may be used instead of the internal pipe clamp 23 for lowering or pulling tubular sections along the firing line L. In the case of lowering tubular sections, the pipe clamp 25 is configured into the pipe retrieve/load position so as to grip a tubular section. The pipe clamp 25 is then configured into the firing line position such that the tubular section lies along the firing line L. The pipe clamp 25 is then moved along the firing line L to a lowered position so as to lower the tubular section until an end of the tubular section contacts or abuts the end of a catenary suspended by the hang-off clamp 7. The tubular section is attached to the end of the catenary by mechanical connection in the present embodiment. Once the tubular section is attached, with the pipe clamp 25 still gripping the tubular section, the hang-off clamp 7 is disengaged and the pipe clamp 25 is lowered to the hand-off position such that the entire catenary with the attached tubular section is lowered.

The hang-off clamp 7 is then re-engaged so as to grip the catenary with the new tubular section attached and the pipe clamp 25 is disengaged and configured into the retracted position. In the retracted position, the pipe clamp 25 is returned to the feed position.

If a given tubular section is the first to be laid, the hang-off clamp 7 is in a disengaged condition and the pipe clamp 25 lowers the tubular section through the hang-off clamp 7. Once the pipe clamp 25 reaches the hand-off position, the hang-off clamp 7 grips the tubular section and the pipe clamp 25 disengages, is configured into the retracted position and returns to the feed position.

In the case of pulling tubular sections, with the end of a catenary suspended by the hang-off clamp 7, the pipe clamp 25 is moved along the firing line L from the feed position to the take-up position and is configured into the firing line position. When in the firing line position, the pipe clamp 25 grips the catenary. With the pipe clamp 25 engaged, the hang-off clamp 7 is disengaged and the pipe clamp 25 is moved along the firing line L toward the feed position, pulling the catenary along the firing line.

Once at or near the feed position, the hang-off clamp 7 is re-engaged so as to grip the catenary. A tubular section is decoupled from the catenary by cutting the length of catenary located between the pipe clamp 25 and hang-off clamp 7.

With a receptacle 34 aligned and a tubular section decoupled, the pipe clamp 25 is configured into the pipe retrieval/load position so as to feed the decoupled tubular section from the firing line L into the receptacle 34.

Further, the drive mechanism may be separate to the feed mechanism and instead of being a geared drive it may be belt and pulley type system.

Although the supply module 3 is described as having a retention mechanism in the form of retractable pins 35 or retention belts 135 in combination with pipe lips (not shown), this need not be the case. Instead, the supply module 3 may have any, all or none of retractable pins 35, retention belts 135 and pipe lips (not shown).

Although the tubular section is described as being attached to the end of the catenary by mechanical connection, this need not be the case. Instead, a tubular section may be attached to the end of the catenary by welding or any other suitable means of connection.

Figure 10:
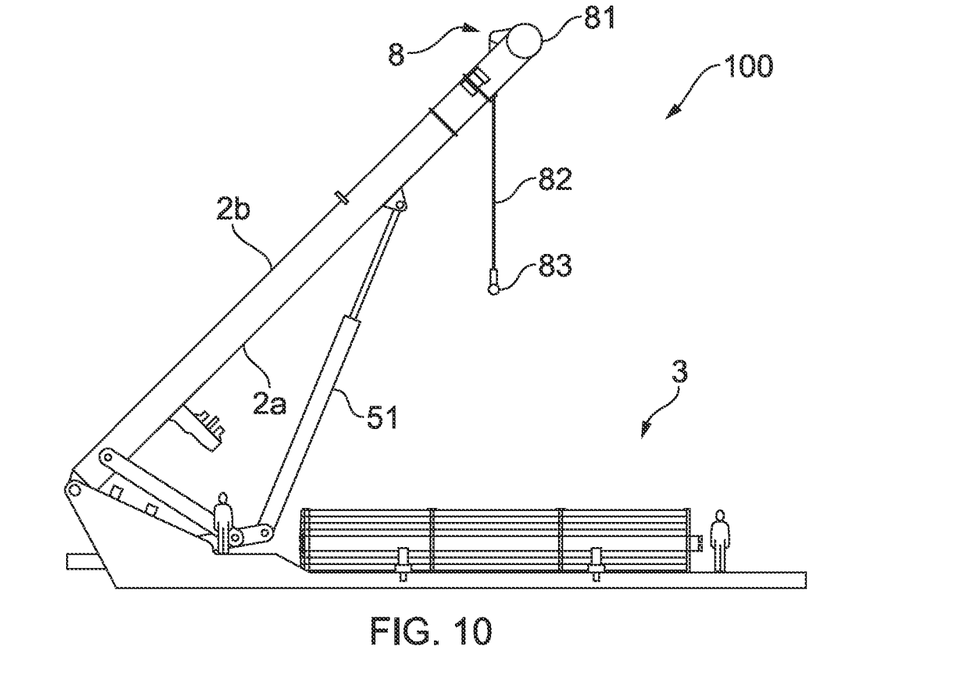
FIG. 10 is a schematic of an apparatus according to an embodiment of the invention in a first position and with a hoist deployed.

Referring now to FIG. 10, there is shown a tubular handling apparatus 100 according to an embodiment of the invention wherein like features to those of tubular installation apparatus and/or tubular recovery apparatus 1 are denoted by like references.

The lay tower 2 is shown in a first position in which it describes an acute angle with the support structure 4. A hoist 8 is located at the second end 22 end of the lay tower 2.

The hoist 8 extends away from the second side 2b of the lay tower 2 in this embodiment. The hoist 8 has a top member 81 having lifting line 82 of fixed length extending therefrom. At the free end of the lifting line 82 is a lifting accessory 83 in the form of a shackle in this embodiment.

A supply module 3 is located below the lifting line 82 on a loading shuttle 6 in the loading location 63 such that a projected line from the lifting line 82 bisects the supply module 3.

Figure 11:
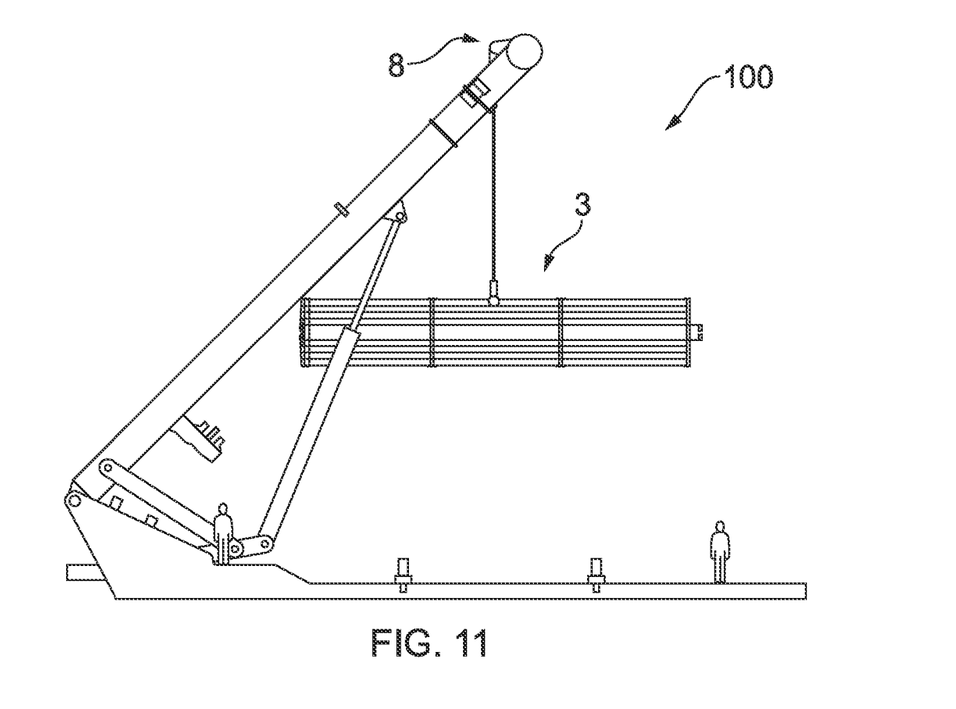
FIG. 11 is a schematic of the apparatus of FIG. 10 in a first position and with a load suspended by the hoist.

Referring now to FIG. 11, there is shown the tubular handling apparatus 100 in the same, first position as per FIG. 10 but with the supply module 3 suspended above the support structure 4 and from the end of the lifting line 82. The lifting accessory 83 is engaged with a lifting point (not shown) located to the centre of the supply module 3.

Figure 12:
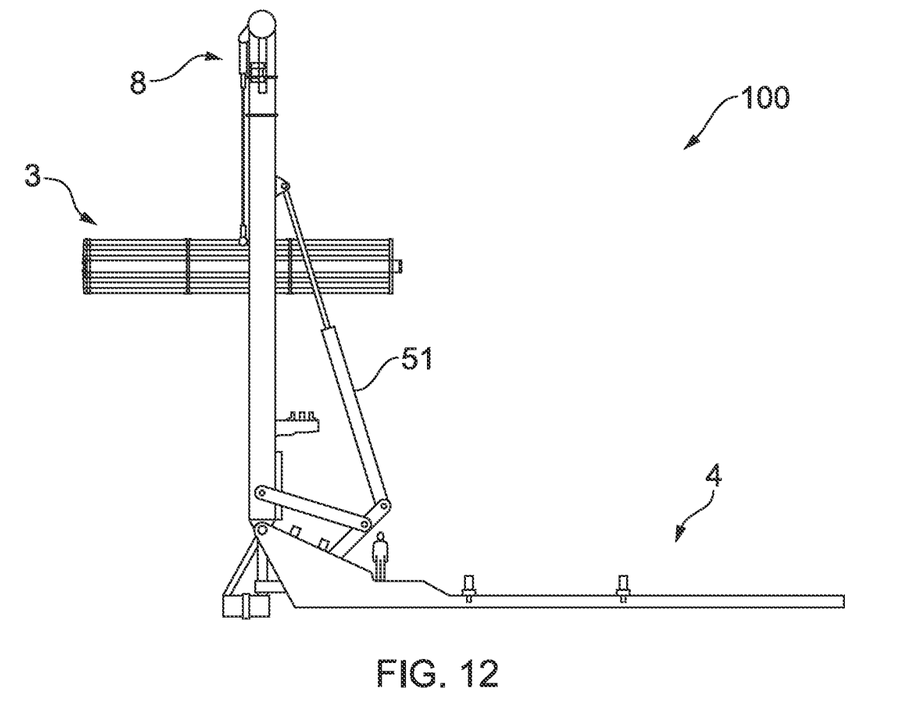
FIG. 12 is a schematic of the apparatus of FIGS. 10 and 11 in a third position and with a load suspended by the hoist.

Referring now to FIG. 12, there is shown the tubular handling apparatus 100 with the supply module 3 suspended from the end of the lifting line 82 and in the third position. In the third position the lay tower 2 extends perpendicularly to the support structure 3. The telescopic member 51 is in a lesser state of retraction than in FIGS. 10 & 11 such that the lay tower 2 is pivoted relative to the support structure 4 about pivot point 21. The supply module 3 is suspended partly over the support structure 4 and partly out with it.

The lay tower 2 has an opening (not shown) through which the supply module 3 extends in the third position such that part of the supply module is suspended over the support structure 4 and partly out with it.

Figure 13:
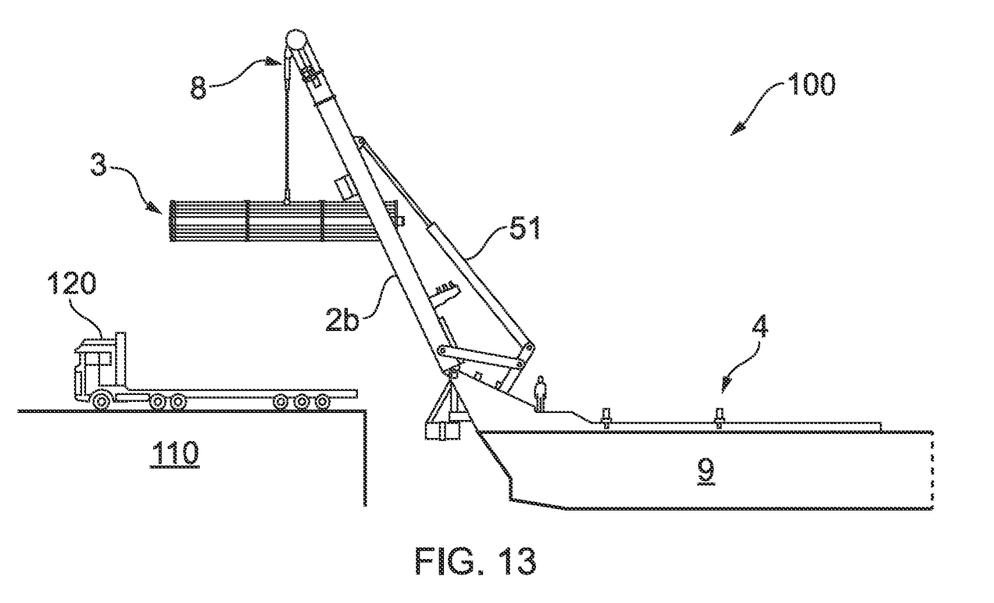
FIG. 13 is a schematic of the apparatus of FIGS. 10 to 12 in a second position and with a load in a first orientation suspended by the hoist.

Referring now to FIG. 13, there is shown the tubular handling apparatus 100 mounted on a vessel 9. The tubular handling apparatus 100 is shown with the supply module 3 suspended from the end of the lifting line 82. In this case, the lay tower 2 is in the second position in which it describes an obtuse angle with the support structure 4. The first position and second position are diametrically opposed to one another in the present embodiment.

The telescopic member 51 is in a lesser state of retraction than in FIGS. 10 to 12 and the supply module 3 is suspended out with the support structure 4.

FIG. 13 also discloses a dock 110 with a truck 120 for receiving the supply module 3.

Figure 14:
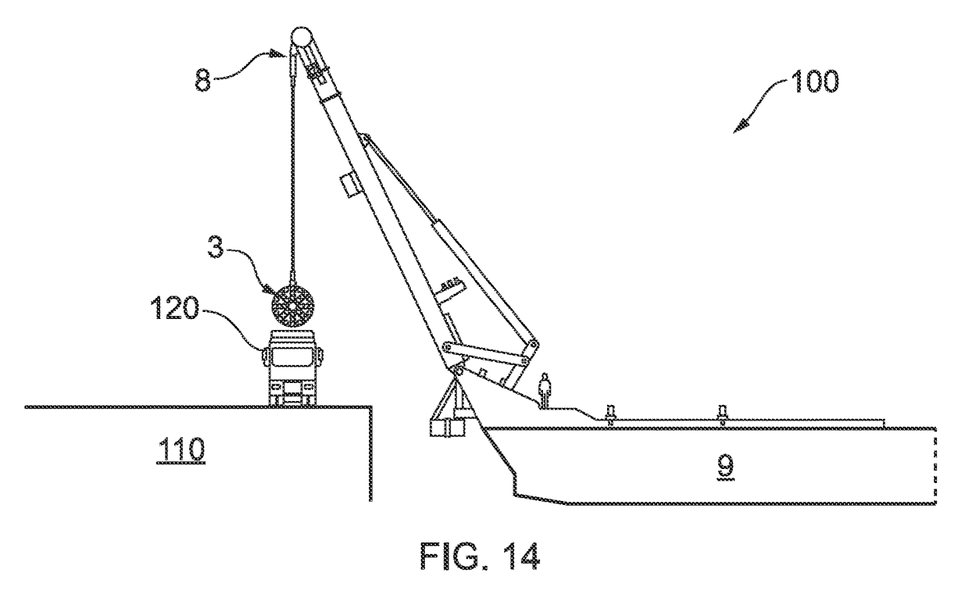
FIG. 14 is a schematic of the apparatus of FIGS. 10 to 13 in a second position and with a load in a second orientation suspended by the hoist.

Referring now to FIG. 14, there is shown the tubular handling apparatus 100 as per FIG. 13 mounted to vessel 9 but with the suspended supply module 3 rotated 90 degrees relative to that of FIG. 13.

In use, with the tubular handling apparatus 100 mounted on a vessel 9 and with a supply module 3 located in the loading location 63, the lay tower 2 is configured into the first position in which the hoist 8 is located above the first side 2a of the lay tower 2 and above the supply module 3.

The lifting line 82 extends from the top member 81 such that the lifting accessory 83 can be attached to the supply module 3 at the lifting point (not shown). The lay tower 2 is pivoted relative to the support structure 4 a sufficient amount such that the lifting line 82 can be attached to the supply module 3. Once the supply module 3 is attached, the lay tower 2 is pivoted relative to the support structure 4 so as to lift the supply module 3 above the support structure 4. In the present embodiment, the lifting line 82 is of a length such that the supply module 3 is lifted to a sufficient height such that it will clear any lay tower 2 structure in moving the lay tower 2 from the first position to the second position.

With the supply module 3 attached to the lifting line 82, the telescopic member 51 is hydraulically actuated to reduce its state of retraction and pivot the lay tower 2 relative to the support structure 4. Pivoting the lay tower 2 causes it to move through the third position to the second position. In the second position, the supply module 3 is suspended over the truck 120 on the dock 110 and the hoist 8 is located above the second side 2b of the lay tower 2.

In moving from the first position to the second position, the supply module 3 passes through an opening (not shown) in the lay tower 2. Once in the second position, the lay tower 2 is pivoted a sufficient amount until the supply module 3 is supported on the trailer of the truck 120. The lifting accessory 83 is then detached from the supply module 3.

Although the apparatus 100 is described as transferring a supply module 3 from the first side 2a of the lay tower 2 to the second side 2b of the lay tower 2, this need not be the case. The same process as above may be followed in transferring a supply module 3 or any other object from the second side 2b to the first side 2a, for example when loading onto a vessel 9.

Although the hoist 8 is described as having a lifting line 82 of fixed length extending from a top member 81, this need not be the case. Instead the hoist 8 may comprise a winch. The winch having a drum attached or mounted to the top member and arranged to store a length of lifting line. The lifting line may be payed out from the drum so that it can be attached to the supply module 3. Once the supply module 3 is attached, the hoist 8 may be operated to draw the lifting line in and lift the supply module 3 above the support structure 4 a sufficient amount to clear any lay tower 2 structure.

Once in the second position, the lifting line may be payed out so as to lower the supply module 3.

Alternatively, the hoist 8 may comprise a winch attached to a vessel 9 or to the support structure 4. The hoist 8 may have one or more sheaves attached or mounted to the top member and arranged to receive a lifting line from the winch. The lifting line from the winch is passed around the sheaves and attached to the supply module 3 with the lay tower 2 in the first position. The lifting line may be drawn into the winch so as to lift the supply module, utilising the mechanical advantage provided by the sheaves.

The supply module 3 may be transported by operating the winch in concert with movement of the lay tower 2 from the first position to the second position such that the load remains suspended.

Further, although it is shown that the tubular handling apparatus 100 is used for lifting and transporting a supply module 3, this need not be the case. The tubular handling apparatus 100 may be used to lift and transport any suitable object.

Although it is shown that the supply module 3 is lowered on to the trailer of the truck 120 this need not be the case. Instead, the supply module 3 may be lowered directly on to the ground or any other supporting surface.

Although the tubular handling apparatus 100 is described as transporting an object by pivoting the lay tower 2 from the first position through the third position to the second position by passing the object through an opening in the lay tower 2, this need not be the case. Instead, the lay tower 2 may be rotatable about the axis of the lay tower 2 with a constant orientation about the pivot axis 21.

Further, although the tubular handling apparatus 100 is described as having a lay tower 2, this may also or alternatively be a recovery tower 2.

Figure 15:
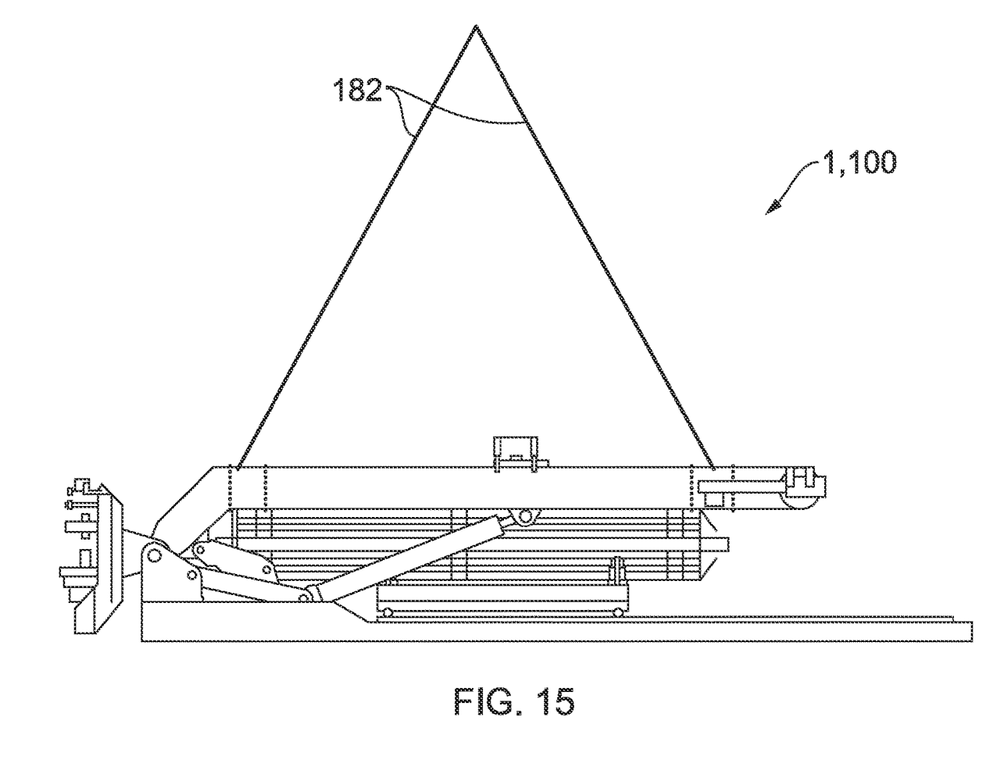
FIG. 15 is a schematic of an apparatus of FIGS. 1, 5 to 8 or 10 to 13 attached to a lifting apparatus.

Referring now to FIG. 15, there is shown a tubular installation apparatus, tubular recovery apparatus or tubular handling apparatus 1, 100 in a collapsed position.

In the collapsed position, the telescopic member 51 is fully retracted, the loading shuttle 6 is locked in place to prevent movement during lifting and all other movable components are locked or secured to prevent inadvertent movement during lifting. A pair of lifting lines 182 from an external lifting apparatus (not shown) are connected to the apparatus 1, 100 at spaced lifting points (not shown).

In the collapsed position, the apparatus 1, 100 forms a transportable, modular structure than can be loaded to and/or unloaded from a vessel (not shown).

It will also be appreciated by those skilled in the art that any number of combinations of the aforementioned features and/or those shown in the appended drawings provide clear advantages over the prior art and are therefore within the scope of the invention described herein.

The invention claimed is:

1. A tubular installation apparatus comprising a lay tower mounted to a support structure, the lay tower configured to lower a tubular section along a firing line extending along the lay tower, the lay tower comprising an attachment or joining mechanism configured to attach, join or secure a tubular section fed into the firing line to the end of a catenary, a magazine removably mounted to the lay tower while the apparatus is in use in a laying position, the magazine being configured to be pre-loaded with a plurality of tubular sections and a feed mechanism configured to feed one or more tubular sections from the magazine to the firing line of the lay tower for connection to the end of a catenary, wherein at least part of the lay tower is movable in use between a deployed, laying position for laying tubular sections, and a horizontal loading position for loading the magazine onto the lay tower.

2. The apparatus according to claim 1, wherein the magazine comprises a removable carousel having one or more receptacles for receiving the tubular sections.

3. The apparatus according to claim 2, wherein the carousel comprises a plurality of receptacles about its periphery and the feed mechanism is configured to index to one of a plurality of positions to align one of the receptacles with the firing line.

4. The apparatus according claim 1, wherein the feed mechanism comprises a pipe clamp movable between a retrieval position, in which it is configured to extend into the magazine to retrieve a tubular section, a firing line position, in which an axis of the pipe clamp is on or collinear with the firing line, and a retracted position, in which the pipe clamp is positioned away from the firing line.

5. The apparatus according to claim 1, wherein the magazine is releasably attached to the lay tower by a hydraulic latch and comprises a retention mechanism for retaining the tubular sections in the magazine.

6. The apparatus according to claim 1, wherein at least part of the lay tower is pivotable between the deployed, laying position in which it describes and/or is aligned with the firing line, and the loading position in which it is aligned with a loading shuttle for loading or unloading a magazine.

7. The apparatus according to claim 6, comprising a hydraulic actuator configured to pivot the lay tower between the deployed, laying position and the loading position.

8. The apparatus according to claim 1, comprising a loading shuttle configured to transfer the magazine between a storage location and a loading location in which it can be mounted to the lay tower.

9. The apparatus according to claim 1, comprising a hang-off clamp.

10. The apparatus according to claim 1, wherein the support structure comprises a skid to which the lay tower structure is mounted, and wherein the skid comprises one or more lifting points for connection to a crane.

11. A vessel comprising a tubular installation apparatus according to claim 1.

12. A method of laying one or more tubular sections using a tubular installation apparatus, the tubular installation apparatus comprising a lay tower mounted to a support structure, the lay tower configured to lower a tubular section along a firing line extending along the lay tower, the lay tower comprising an attachment or joining mechanism configured to attach, join or secure a tubular section fed into the firing line to the end of a catenary, a magazine removably mounted to the lay tower while the apparatus is in use in a laying position, the magazine being configured to be pre-loaded with a plurality of tubular sections and a feed mechanism configured to feed one or more tubular sections from the magazine to the firing line of the lay tower for connection to the end of a catenary, wherein at least part of the lay tower is movable in use between a deployed, laying position for laying tubular sections, and a horizontal loading position for loading the magazine onto the lay tower, the method comprising: mounting a magazine pre-loaded with a plurality of tubular sections to a lay tower, feeding a tubular section from the magazine into the firing line of the lay tower for connection to the end of a catenary and configuring the lay tower into a loading position prior to mounting the pre-loaded magazine.

13. The method according to claim 12, comprising moving the lay tower from the loading position to a deployed, laying position for laying tubular sections, with the magazine mounted.

14. The method according to claim 12, comprising attaching a tubular section fed into the firing line of the lay tower to the end of a catenary, lowering the catenary with the attached tubular section and feeding a further tubular section from the magazine to the firing line of the lay tower.

15. The method according to claim 14, wherein once the magazine is at least partially empty, moving the lay tower from the deployed, laying position to the loading position and unmounting the magazine from the lay tower, and wherein moving the lay tower comprises pivoting the lay tower.

16. The method according to claim 15, wherein pivoting the lay tower comprises operating a hydraulic actuator.

17. The method according to claim 14, wherein the catenary is suspended from a hang-off clamp.

18. The method according to claim 12, wherein mounting and/or unmounting the magazine comprises operating a hydraulic latch.

19. The method according to claim 12, comprising transferring a loading shuttle with a pre-loaded magazine from a storage location to a loading location prior to mounting the magazine to the lay tower.

20. The method according to claim 19, comprising transferring the loading shuttle with an at least partially empty magazine from the loading location after unmounting the magazine from the lay tower.

* * * * *